Patented Sept. 19, 1939

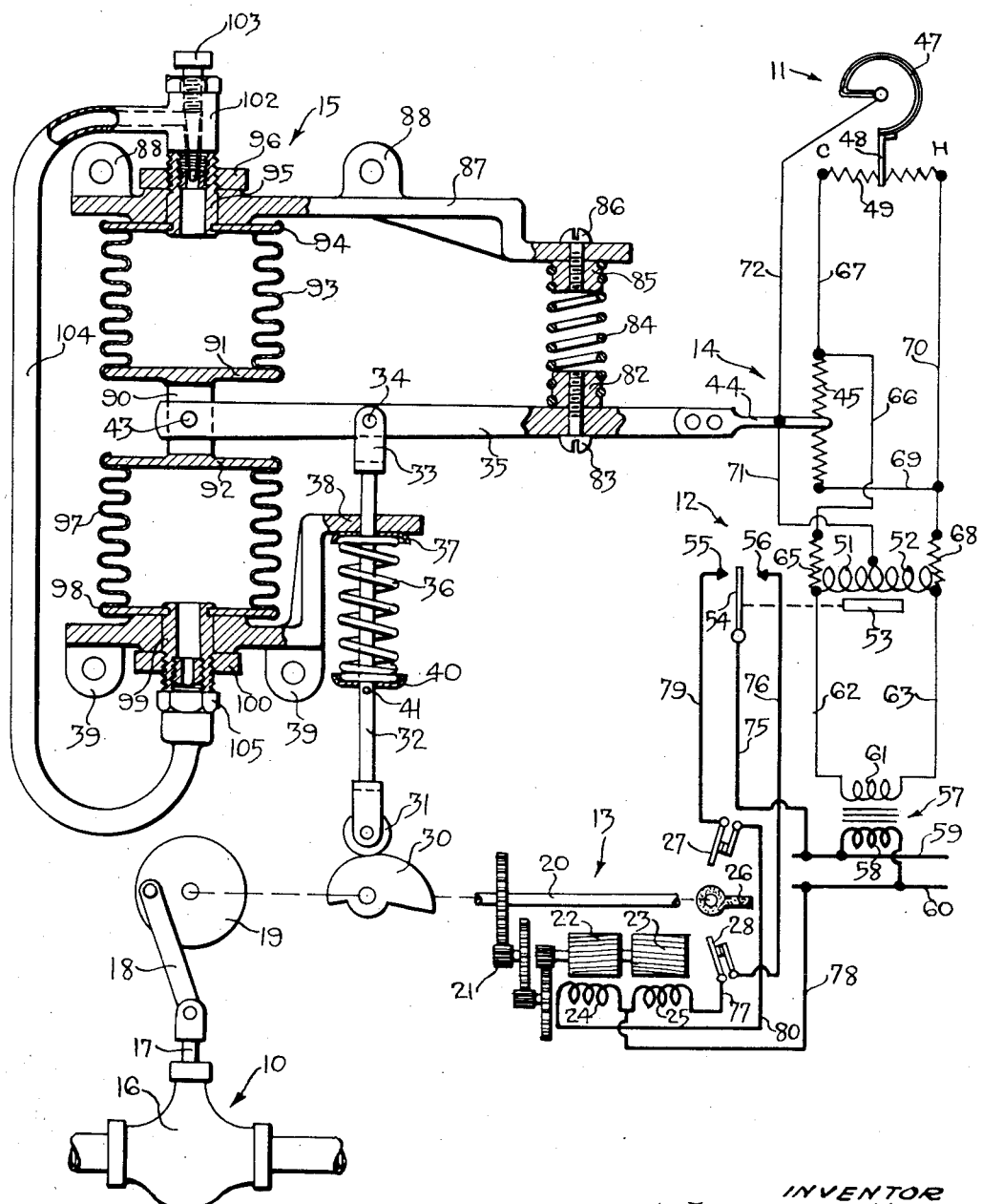

2,173,810

UNITED STATES PATENT OFFICE 2,173,810

AUTOMATIC RESET MECHANISM

Daniel G. Taylor, Minneapolis, Minn., assignor to Minneapolis-Honeywell Regulator Company, Minneapolis, Minn., a corporation of Delaware Application November 23, 1936, Serial No. 112,325

6 Claims. (Cl. 236—74)

This invention relates to automatic reset or load compensation mechanisms and more particularly to that type of mechanism as applied to a follow-up control system.

It is an object of this invention to provide a follow-up control system for controlling the value of a condition along with a novel automatic reset or load compensation mechanism whereby the value of the condition to be controlled is maintained at a substantially constant value regardless of changes in load.

Another object of this invention is to provide a reset mechanism of novel construction wherein a hydraulic dash-pot arrangement and a spring arrangement perform the reset function.

Other objects and advantages will become apparent to those skilled in the art upon reference to the accompanying specification, claims and drawing.

For a more thorough understanding of this invention, reference is made to the accompanying single sheet of drawings in which is diagrammatically disclosed the preferred form of this invention.

Referring now to the drawing, a device to be positioned in a plurality of positions for controlling the value of a condition is generally indicated at 10. A control means the state of which is varied in accordance with changes in the value of the condition to be controlled is generally designated at 11. The control means 11 operates a relay generally designated at 12 and the relay 12 operates a motor generally designated at 13. The motor 13 positions the device 10 and also actuates a follow-up means generally designated at 14. The follow-up means 14 also controls the operation of the relay 12. An automatic reset mechanism generally designated at 15 alters the operation of the follow-up means 14 to maintain the value of the condition to be controlled substantially constant regardless of changes in load.

Although the control system of this invention may be utilized for controlling any condition, it is shown for purposes of illustration as controlling a temperature condition and more particularly the temperature of a space (not shown). Therefore, the device 10 to be positioned in a plurality of positions is shown to comprise a valve 16 for controlling the supply of heating fluid to the space. The valve 16 may be operated by a valve stem 17 which is connected by a pitman 18 to a crank disc 19 carried by a shaft 20 of the motor 13. The shaft 20 is operated through a reduction gear train 21 by motor rotors 22 and 23. Motor rotors 22 and 23 are operated by field windings 24 and 25, the arrangement being such that when the field winding 25 is energized the valve 16 is moved towards an open position, and when the field winding 24 is energized the valve 16 is moved towards a closed position. The shaft 20 also operates an abutment member 26 preferably made of insulating material for opening limit switches 27 and 28 when the valve 16 is moved to an extreme closed position or an extreme open position, respectively.

The shaft 20 also carries a cam 30 which operates against a cam follower 31 secured to a reciprocating rod 32. The rod 32 carries a bracket 33 which is pivoted by a pivot 34 to a lever 35. A spring 36 engages a spring cup 37 which, in turn, abuts a bracket 38 secured by suitable lugs 39 to a support. Spring 36 also engages a spring cup 40 which is held in position on the rod 32 by a pin 41. The spring 36, therefore, maintains the cam follower 31 in engagement with the cam 30. The lever 35 is pivoted at one end at 43 and carries at its other end a slider 44 adapted to slide across a potentiometer resistance element 45. The slider 44 and the potentiometer resistance element 45 form a balancing potentiometer. When the valve 16 is moved towards an open position, the cam 30 is rotated in a clockwise direction and the slider 44 of the balancing potentiometer is moved downwardly with respect to the potentiometer resistance element 45. When the valve 16 is moved towards a closed position, the cam 30 is moved in a counter-clockwise direction to move the slider 44 upwardly with respect to the balancing potentiometer resistance element 45.

The control means generally designated at 11 is shown to be a thermostatic control means having a thermostatic element 47 responsive to variations in space temperature. The thermostatic element 47 operates a slider 48 with respect to a potentiometer resistance element 49. Upon a decrease in space temperature, the slider 48 is moved to the left in the direction indicated by the character C, and upon an increase in space temperature, the slider 48 is moved toward the right in the direction indicated by the character H. When the space temperature is at the desired normal value, the slider 48 assumes a midposition as shown in the drawing, and this represents the normal state of the control means 11.

The relay generally designated at 12 may comprise relay coils 51 and 52 for operating an armature 53. The armature 53 is suitably connected to a switch arm 54 which is adapted to engage contacts 55 and 56. When the relay coil 51 is energized more than the relay coil 52, the switch arm 54 is moved into engagement with the contact 55 and when the relay coil 52 is energized more than the relay 51, the switch arm 54 is moved into engagement with the contact 56. When the relay coils 51 and 52 are equally energized, the switch arm 54 is maintained spaced midway between the contacts 55 and 56. Power is supplied to the relay 12 by means of a step-down transformer 57 having a primary 58 connected across line wires 59 and 60 and a secondary 61. One end of the secondary 61 is connected by a wire 62 to the left end of the relay coil 51, and the other end of the secondary 61 is connected by a wire 63 to the right end of the relay coil 52. The adjacent ends of the relay coils 51 and 52 are connected together. By reason of these connections, it is seen that the relay coils 51 and 52 are connected in series and across the secondary 61.

The left end of the relay coil 51 is connected by a protective resistance 65 and wires 66 and 67 to the left end of the control potentiometer resistance element 49 and to the upper end of the balancing potentiometer resistance element 45. The right end of the relay coil 52 is connected by a protective resistance 68 and wires 69 and 70 to the right end of the control potentiometer resistance element 49 and the lower end of the balancing potentiometer resistance element 45. The junction of the relay coils 51 and 52 is connected by wires 71 and 72 to the slider 44 of the balancing potentiometer and the slider 48 of the control potentiometer. By reason of these wiring connections, it is seen that the control potentiometer and the balancing potentiometer are connected in parallel with the series connected relay coils 51 and 52 and across the secondary 61 of the step-down transformer 57.

Omitting for the time being the action of the reset mechanism 15, it is assumed that the parts are in the position shown in the drawing. As a result of the valve 16 being in a mid-position, the slider 48 being in a mid-position corresponding to the normal desired space temperature, and the slider 44 of the balancing potentiometer also being in a mid-position, just the correct amount of heat is being supplied to the space to make up for the heat losses from the space. Upon an increase in the heating load, the space temperature decreases to move the slider 48 of the control potentiometer to the left in the direction indicated by the character C. This causes partial short circuiting of the relay coil 51 to decrease the energization thereof and to increase the energization of the relay coil 52. The switch arm 54 is thereupon moved into engagement with the contact 56 to complete a circuit from the line wire 59 through wire 75, switch arm 54, contact 56, wire 76, limit switch 28, wire 77, field winding 25, and wire 78 back to the other line wire 60. Completion of this circuit causes energization of the field winding 25 to move the valve 16 towards an open position. Operation of the motor 13 to move the valve 16 towards an open position also moves the slider 44 of the balancing potentiometer downwardly and this downward movement of the slider 44 partially short-circuits the relay coil 52 to decrease the energization thereof and to increase the energization of the relay coil 51. When the slider 44 has moved downwardly sufficiently far to rebalance the energizations of the relay coils 51 and 52, the switch arm 54 is moved out of engagement with the contact 56 to stop operation of the motor 13. In this manner, the valve 16 is modulated towards an open position in accordance with the decrease in space temperature.

Upon a decrease in the heating load which causes an increase in the space temperature, the slider 48 is moved to the right in the direction indicated by the character H. This causes partial short circuiting of the relay coil 52 to decrease the energization thereof and increase the energization of the relay coil 51. As a result of these unequal energizations of the relay coils 51 and 52, the switch arm 54 is moved into engagement with the contact 55 to complete a circuit from the line wire 59 through wire 75, switch arm 54, contact 55, wire 79, limit switch 27, wire 80, field winding 24, and wire 78 back to the other line wire 60. Completion of this circuit causes energization of the field winding 24 to move the valve 16 towards a closed position. Operation of the motor 13 to move the valve 16 towards a closed position causes upward movement of the slider 44 of the balancing potentiometer. This upward movement of the slider 44 partially short-circuits the relay coil 51 to decrease the energization thereof and increase the energization of the relay coil 52. When the slider 44 has moved upwardly sufficiently far to rebalance the energizations of the relay coils 51 and 52, the switch arm 54 is moved out of engagement with the contact 55 to stop further operation of the motor 13. In this manner, the valve 16 is moved toward a closed position in direct accordance with the amount of increase in space temperature.

By reason of the above construction, a follow-up system is provided wherein the valve 16 is modulated in accordance with variations in space temperature. It is found that if the control range of the control potentiometer is made sufficiently narrow to give an extremely accurate temperature control, "hunting" is likely to occur. If the control range is made sufficiently wide to eliminate "hunting", the control system is likely to "droop". That is, when the heating load is relatively great, the space temperature is maintained at a lower value than when the heating load is relatively light. In order to eliminate "hunting" and to eliminate "drooping" of the follow-up system, the automatic reset mechanism generally designated at 15 is provided.

The lever 35 has secured thereto a spring anchor member 82 by means of a screw 83. One end of a spring 84 is secured to the spring anchor member 82 and the other end of the spring 84 is secured to an anchor member 85. The anchor member 85 is suitably secured to a bracket 87 by a screw 86. The bracket 87 is secured to a suitable support by means of lugs 88. The spring 84 is a combination tension and compression spring and in the position shown in the drawing it is in a neutral condition, that is, neither tension nor compression exists within the spring 84. The pivot 43 about which the lever 35 pivots is carried by a member 90 having movable heads 91 and 92. One end of a bellows 93 is sealed to the head 91 and the other end thereof is sealed to a plate 94. The plate 94 is clamped to the bracket 87 by a nipple 95 and a nut 96. The nipple 95 has a passage therethrough. The movable enclosure 92 has secured thereto one end of a bellows 97, the other end of the bellows 97 being secured to a plate 98. The plate 98 is clamped to the bracket 38 by a nipple 99 and a nut 100. The bellows 93 and 97 form a resilient mounting for the pivot 43. The bellows 93 and 97 because of their resiliency act as springs for moving or biasing the pivot 43 to a given position. The bellows 93 and 97 and the combination tension and compression spring 84 are so arranged that regardless of the position of the pivot 34 operated by the motor 13 the slider 44 will be biased to a mid-position with respect to the balancing potentiometer resistance element 45. If the sum of the spring rates of the bellows 93 and 97 equals the spring rate of the combination compression and tension spring 84, and if the ratio of the distance from the pivot point 43 to the resistance element 45 to the distance from the screw 83 to the resistance element 45 equals the ratio of the distance from the pivot 34 to the screw 83 to the distance from the pivot 43 to the pivot 34, the slider 44 will be maintained in a mid position with respect to the balancing potentiometer resistance element regardless of the position of the pivot 34 operated by the motor 13. In other words, the slider 44 is at all times biased to a mid position with respect to the position of the balancing potentiometer resistance element 45.

A throttling valve 102 having a suitable operating knob 103 is connected to the passage in the nipple 95 and the throttling valve 102 is connected by a passage 104 and a coupling 105 to a passage in the nipple 99. In other words, the chambers enclosed by the bellows 93 and 97 are connected together through a passage 104 and the restriction of the passage 104 is controlled by the throttling valve 102. The bellows 93 and 97 and the passage 104 are completely filled with a fluid and this fluid is preferably a substantially non-elastic liquid.

Assume now that the throttling valve 102 is open to a given position so as to permit a restricted flow from the chamber 93 to the chamber 97 and vice versa. Also, assume the parts are in the position shown in the drawing. Upon an increase in the heating load which causes a decrease in space temperature, the slider 48 is moved to the left in the direction indicated by the character C. This partially short-circuits the relay coil 51 to decrease the energizations thereof and increase the energization of the relay coil 52 to operate the motor 13 to move the valve 16 towards an open position. Movement of the valve 16 towards the open position causes downward movement of the pivot 34, and consequently, downward movement of the slider 44 since the pivot 43 is held relatively stationary by reason of the liquid contained within the bellows 93 and 97. Downward movement of the pivot 34 and the slider 44 places the combination tension and compression spring 84 in tension. Also, downward movement of the slider 44 rebalances the relay 12 so that the valve 16 is moved toward an open position in direct accordance with the amount of decrease in space temperature. As soon as the spring 84 is placed in tension, it tends to move the slider 44 back toward the mid position but this movement is retarded by the liquid contained in the bellows 93 and 97. Due to the effect of the spring 84, liquid is transferred from the bellows 97 through the passage 104 into the bellows 93 and this transfer of liquid is regulated by the throttling valve 102. As the liquid is transferred from the bellows 97 into the bellows 93, the slider 44 is moved toward the mid position and as the slider 44 moves toward the mid position, the relay coil 51 is partially short-circuited to decrease the energization thereof and to increase the energization of the relay coil 52.

This causes energization of the field winding 25 to move the valve 16 further towards an open position. This further movement of the valve 16 towards an open position causes downward movement of the slider 44 of the balancing potentiometer and also increases the tension in the spring 84 which causes the transfer of more liquid from the bellows 97 to the bellows 93. As long as the space temperature is less than the normal desired value, the valve 16 will be continued in its movement towards an open position and as a result of this continued opening movement, the temperature of the space will return to the desired normal value. When the slider 48 of the control potentiometer has returned to the mid position, the relay 12 will be rebalanced and further opening movement of the valve 16 will be prevented. The valve 16 is therefore positioned differently with respect to the value of the space temperature. In other words, the valve 16 is reset with respect to the position of the control potentiometer in accordance with the amount of increase in the heating load. By suitably adjusting the throttling valve 102, the rate at which the valve 16 is further positioned toward an open position may be adjusted.

Upon a decrease in the heating load, the space temperature increases to partially short-circuit the relay coil 52 to cause energization of the field winding 24. The valve 16 is thereupon moved toward a closed position and the slider 44 of the balancing potentiometer is moved upwardly with respect to the resistance element 45, this upward movement being permitted by the relatively stationary pivot 43. Upward movement of the slider 44 rebalances the relay 12 and, therefore, the valve 16 is moved toward a closed position in accordance with the amount of increase in the space temperature. Upward movement of the slider 44 also places the spring 84 in compression which acts to transfer liquid from the bellows 93 through the passage 104 into the bellows 97 and the rate at which the liquid is so transferred is controlled by the throttling valve 102. As liquid is transferred from the bellows 93 to the bellows 97, the slider 44 of the balancing potentiometer moves toward the mid position and this causes partial short circuiting of the relay coil 52 to move the valve 16 further toward a closed position. As long as the space temperature is greater than the normal desired value, the valve 16 will be moved toward the closed position and the rate of such movement of the valve 16 toward the closed position is controlled by the adjustment of the throttling valve 102. Therefore, the valve 16 is reset towards a closed position in accordance with the decrease in the heating load.

From the above, it is seen that I have provided a follow-up control system for controlling the value of a condition wherein a novel reset mechanism is utilized for maintaining the value of the condition at the desired normal value regardless of changes in load. Means are provided for adjusting the rate of reset of the control system and if a proper adjustment is made "hunting" and drooping" of the follow-up control system is entirely prevented.

Although for purposes of illustration, I have shown one form of my invention, other forms thereof may become obvious to those skilled in the art upon reference to the accompanying specification and, therefore, this invention is to be limited only by the scope of the appended claims and prior art.

I claim:

1. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a relatively stationary member and a movable member cooperating therewith, a lever for moving said movable member with respect to said stationary member, a pivot for said lever, means engaging said lever and operated by said device for moving the movable member with respect to the stationary member, resilient means acting on said lever, resilient means supporting the pivot, both of said resilient means acting to bias the movable member to a given position with respect to the stationary member irrespective of the device operated means additionally to position the device with respect to the state of the control means, and means for delaying the biasing action of the last mentioned resilient means.

2. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a relatively stationary member and a movable member cooperating therewith, a lever for moving said movable member with respect to said stationary member, a pivot for said lever, means engaging said lever and operated by said device for moving the movable member with respect to the stationary member, resilient means acting on said lever, resilient means supporting the pivot, both of said resilient means acting to bias the movable member to a given position with respect to the stationary member irrespective of the device operated means additionally to position the device with respect to the state of the control means, means for delaying the biasing action of the last mentioned resilient means, and means for adjusting said last mentioned means.

3. In combination, a device to be positioned in a plurality of positions for controlling the value of a condition, control impedance means adjusted in accordance with changes in the value of the condition to be controlled, balancing impedance means adjusted by said device, means controlled by the adjustments of the control impedance means and the balancing impedance means for positioning said device in accordance with changes in the value of the condition to be controlled, said balancing impedance means including a relatively stationary member and a movable member cooperating therewith, a lever for moving said movable member with respect to said stationary member, a pivot for said lever, means engaging said lever and operated by said device for moving the movable member with respect to the stationary member, resilient means acting on said lever, resilient means supporting the pivot, both of said resilient means acting to bias the movable member to a given position with respect to the stationary member irrespective of the device operated means additionally to position the device with respect to the adjustment of the control impedance means, and means for delaying the biasing action of the last mentioned resilient means.

4. In combination, a device to be positioned in a plurality of positions for controlling the value of a condition, control resistance means adjusted in accordance with changes in the value of the condition to be controlled, balancing resistance means adjusted by said device, relay means controlled by the adjustments of the control resistance means and the balancing resistance means for positioning said device in accordance with changes in the value of the condition to be controlled, said balancing resistance means including a relatively stationary member and a movable member cooperating therewith, a lever for moving said movable member with respect to said stationary member, a pivot for said lever, means engaging said lever and operated by said device for moving the movable member with respect to the stationary member, resilient means acting on said lever, resilient means supporting the pivot, both of said resilient means acting to bias the movable member to a given position with respect to the stationary member irrespective of the device operated means additionally to position the device with respect to the adjustment of the control resistance means, and means for delaying the biasing action of the last mentioned resilient means.

5. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a relatively stationary member and a movable member cooperating therewith, a lever for moving said movable member with respect to said stationary member, a pivot for said lever, means engaging said lever and operated by said device for moving the movable member with respect to the stationary member, resilient means acting on said lever, a pair of fluid filled resilient bellows supporting the pivot and a restricted passage between the bellows, said resilient means and said resilient bellows acting to bias the movable member to a given position with respect to the stationary member irrespective of the device operated means additionally to position the device with respect to the state of the control means in a gradual manner.

6. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a relatively stationary member and a movable member cooperating therewith, a lever for moving said movable member with respect to said stationary member, a pivot for said lever, means engaging said lever and operated by said device for moving the movable member with respect to the stationary member, resilient means acting on said lever, a pair of fluid filled resilient bellows supporting the pivot and a restricted passage between the bellows, said resilient means and said resilient bellows acting to bias the movable member to a given position with respect to the stationary member irrespective of the device operated means additionally to position the device with respect to the state of the control means in a gradual manner, and means for adjusting the restriction of the passage between the bellows to adjust the rate at which the device is additionally positioned.

DANIEL G. TAYLOR.